March 1, 1932.   F. WAGNER   1,847,107
VALVE COMPRISING AN EQUALIZING CHAMBER, A MAIN, AND AN AUXILIARY VALVE
Original Filed June 17, 1926
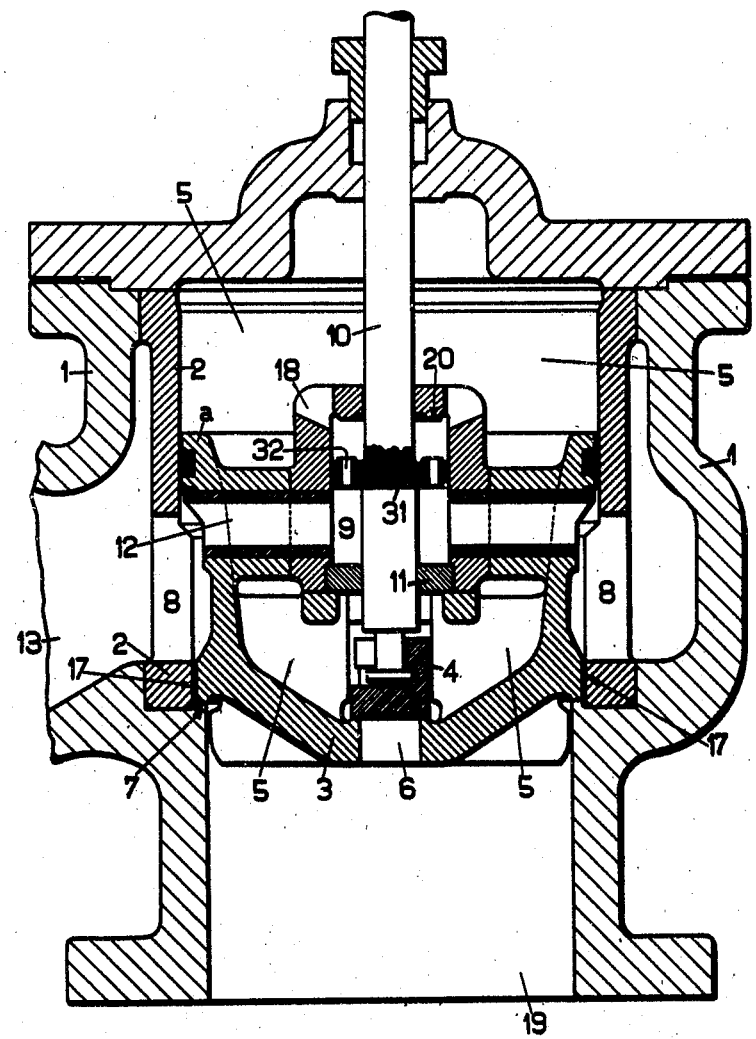
Inventor:
Fritz Wagner
By
Attorney.

Patented Mar. 1, 1932

1,847,107

UNITED STATES PATENT OFFICE

FRITZ WAGNER, OF BERLIN-LICHTERFELDE, GERMANY, ASSIGNOR TO FRITZ WAGNER AND CO., OF BERLIN, GERMANY

VALVE COMPRISING AN EQUALIZING CHAMBER, A MAIN, AND AN AUXILIARY VALVE

Original application filed June 17, 1926, Serial No. 116,643, and in Germany May 22, 1926. Divided and this application filed January 19, 1927. Serial No. 162,122.

My invention relates to valves comprising an equalizing chamber, a main and an auxiliary valve, in which the main and auxiliary valves are connected mechanically as well as by a fluid coupling, the latter being effected by throttling the passage between the equalizing chamber and the fluid inlet.

It is an object of my invention to provide means by which the action of the throttling device may be adjusted within very fine limits and to this end I provide a piston in the said passage which is adapted to cooperate with a check on the main valve, and I provide a perforation or perforations in the said piston through which the fluid flows from the inlet to the equalizing chamber. It will be understood that the area of the perforation or perforations may be throttled by reducing the clearance between the piston and its check on the main valve below the width of the perforation or perforations, and that the throttling action will increase until the piston engages below the check, effecting mechanical coupling between the main and auxiliary valve and eliminating the fluid coupling.

It is another object of my invention to eliminate the necessity of very accurate machining as required in valves of the general type referred to in which variations in the coaxial relations of the spindle and the annular restriction of the passage connecting the equalizing chamber and the fluid inlet must be strictly eliminated as they would generate one-sided forces on the main valve.

It has been proposed to provide a perforated piston on the spindle of an auxiliary valve, the piston fitting a bore in the main valve. The piston, however, does not cooperate with a check on the main valve and so is unable to throttle the passage between the equalizing chamber and the fluid inlet.

It will be understood that the area of the perforation or perforations may be readily adapted to given conditions by boring or inserting liners in them so that any desired operation of the fluid coupling may be achieved. In this manner, hammering of the main valve is absolutely prevented.

In the drawings a valve embodying my invention is illustrated in axial section by way of example.

1 is the valve casing, 2 is a liner inserted in the casing, 3 is the main valve, and a is a piston at the upper end of the main valve which fits the liner. 7 is the seat of the main valve in the casing 1, 4 is the auxiliary valve which is seated above a passage 6 in the bottom of the main valve 3, 5 is the equalizing chamber which is constituted partly by the casing above the piston a and partly by the cavity of the main valve body, 19 is the delivery pipe below the seat 7 of the main valve, 10 is the spindle of the auxiliary valve which projects from a stuffing box in the cover of the casing 1, and 13 is the fluid inlet pipe.

Fluid under pressure, for instance, steam, from the pipe 13 is admitted into tubes 12 through ports 8 in the liner 2. The tubes 12 are inserted, in the manner of stays, in arms of the main valve body and corresponding holes in a fluid chamber 9 which is placed in the main valve. 11 is the bottom plate of the chamber 9 through which the spindle 10 passes, 20 is a check constituted by the surfaced top of the chamber 9, and 18 are passages connecting the top of the chamber below the check 20 with the equalizing chamber 5.

31 is a piston secured on, or integral with, the spindle 10 of the auxiliary valve 4 which fits comparatively tightly in the walls of the chamber 9 but, if desired, may be provided with packing rings or the like. The piston is perforated at 32 and two perforations are shown by way of example but any number, or only a single perforation, may be provided. The width of the perforations may be equal or several perforations may be of various widths.

The second throttling device is constituted partly by the lower ends of the ports 8 which are V-shaped or otherwise reduced in area at the bottom, and a narrow clearance 17 above the seat 7 of the main valve 3. The fluid which has access to the seat 7 is by the combined action of these reduced areas throttled so as to prevent its lifting the valve 3 brusquely which would cause hammering.

When the auxiliary valve 4 is opened the distance between the upper face of the piston 31 and the check 20 is gradually reduced while the main valve 3 is lifted from its seat 7 by the fluid coupling, and the passage between the chamber 9 and the equalizing chamber 5 is reduced gradually until finally the piston engages the check and effects mechanical coupling. Due to the gradual reduction—or increase, as the case may be—of the effective area of the perforation or perforations 32, which, as mentioned, may be selected for any given valve and its conditions of operation, hammering of the check on the piston is prevented when the piston is moved toward, and when it is moved away from, the check 20.

The arrangement of the perforations may be as desired and it is not necessary that two perforations should be diametrically opposite as shown by way of example.

I claim:

A valve comprising a casing, means for supplying fluid under pressure to said casing, an equalizing chamber, a main valve and an auxiliary valve in said casing, means for operating said auxiliary valve, a cylinder in said main valve connected wth said fluid supplying means and said equalizing chamber, a perforated piston fitted in said cylinder and adapted to be reciprocated therein by said means for operating said auxiliary valve, and an abutment on said main valve near the end of said cylinder which is adjacent said equalizing chamber, said abutment being adapted to throttle the perforation in said piston and to be positively engaged by said piston.

In testimony whereof I affix my signature.

FRITZ WAGNER.